(12) United States Patent
Clifford et al.

(10) Patent No.: US 10,346,695 B2
(45) Date of Patent: Jul. 9, 2019

(54) METHOD AND APPARATUS FOR CLASSIFYING LIDAR DATA FOR OBJECT DETECTION

(71) Applicant: GENERAL MOTORS LLC, Detroit, MI (US)

(72) Inventors: David H. Clifford, Royal Oak, MI (US); David J. Hiemenga, Grand Rapids, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 128 days.

(21) Appl. No.: 15/605,275

(22) Filed: May 25, 2017

(65) Prior Publication Data

US 2018/0365506 A1 Dec. 20, 2018

(51) Int. Cl.
| | |
|---|---|
| *G06K 9/00* | (2006.01) |
| *G06K 9/62* | (2006.01) |
| *G06T 17/00* | (2006.01) |
| *G06T 7/11* | (2017.01) |
| *G01S 17/89* | (2006.01) |
| *G01S 17/93* | (2006.01) |
| *G01S 7/48* | (2006.01) |
| *G06K 9/32* | (2006.01) |
| *G06K 9/46* | (2006.01) |
| *G06K 9/56* | (2006.01) |

(52) U.S. Cl.
CPC ........ *G06K 9/00818* (2013.01); *G01S 7/4808* (2013.01); *G01S 17/89* (2013.01); *G01S 17/936* (2013.01); *G06K 9/00201* (2013.01); *G06K 9/00825* (2013.01); *G06K 9/3233* (2013.01); *G06K 9/4642* (2013.01); *G06K 9/56* (2013.01); *G06K 9/6267* (2013.01); *G06T 7/11* (2017.01); *G06T 17/00* (2013.01); *G06T 2207/10028* (2013.01); *G06T 2207/20021* (2013.01)

(58) Field of Classification Search
CPC ............. G06K 9/00818; G06K 9/6267; G06K 9/00825; G01S 17/89; G06T 7/11; G06T 17/00; G06T 2207/10028; G06T 2207/20021
USPC ........................................................ 382/103
See application file for complete search history.

(56) References Cited

U.S. PATENT DOCUMENTS

| | | | |
|---|---|---|---|
| 2010/0045674 A1* | 2/2010 | Clifton | G06K 9/00201 345/424 |
| 2011/0080336 A1* | 4/2011 | Leyvand | A63F 13/06 345/156 |

FOREIGN PATENT DOCUMENTS

GB  2532948 A * 6/2016 ......... G06K 9/00201

* cited by examiner

*Primary Examiner* — Amandeep Saini

(57) ABSTRACT

A method and apparatus for classifying light detection and ranging sensor data are provided. The method includes transforming sensor data of the LIDAR into point cloud data, selecting a cell including a subset of the point cloud data, dividing the selected cell into a plurality of voxels, calculating a difference of gradients for the plurality of voxels, performing a first pass on the plurality of voxels to identify voxels that contain an object based the difference of gradients, performing a second pass on the plurality of voxels to identify voxels that contain the object by adjusting a voxel with at least one from among a jitter parameter and a rotation parameter, and outputting a centroid average of voxels identified as containing the object.

18 Claims, 3 Drawing Sheets

METHOD AND APPARATUS FOR CLASSIFYING LIDAR DATA FOR OBJECT DETECTION

INTRODUCTION

Apparatuses and methods consistent with exemplary embodiments relate to light detection and ranging. More particularly, apparatuses and methods consistent with exemplary embodiments relate classifying light detection and ranging information.

SUMMARY

One or more exemplary embodiments provide a method and an apparatus that processes light detection and ranging information. In particular, one or more exemplary embodiments provide a method and an apparatus classify light detection and ranging information for performing object detection.

According to an exemplary embodiment, a method for classifying light detection and ranging (LIDAR) sensor data is provided. The method includes: transforming sensor data of the LIDAR into point cloud data, selecting a cell including a subset of the point cloud data, dividing the selected cell into a plurality of voxels, calculating a difference of gradients for the plurality of voxels, performing a first pass on the plurality of voxels to identify voxels that contain an object based the difference of gradients, performing a second pass on the plurality of voxels to identify voxels that contain the object by adjusting a voxel with at least one from among a jitter parameter and a rotation parameter, and outputting a centroid average of voxels identified as containing the object.

The point cloud data may include at least one from among LASer (LAS) file format and point cloud data (PCD) file format.

The point cloud data may include x coordinate data, y coordinate data, z coordinate data and a reflective intensity value.

The performing the second pass on the plurality of voxels to identify voxels that contain the object may include adjusting a voxel with the rotation parameter by rotating points of the voxels, comparing the adjusted voxel to clustered data, and outputting a centroid average of the adjusted voxel identified as containing the object if the comparing indicates the adjusted voxel contains the object.

The performing the second pass on the plurality of voxels to identify voxels that contain the object may include adjusting a voxel with the jitter parameter by translating points of the voxel, comparing the adjusted voxel to clustered data, and outputting a centroid average of the adjusted voxel identified as containing the object if the comparing indicates the adjusted voxel contains the object.

The object includes at least one from among a traffic control device, a traffic control sign, and a traffic control light.

The calculating the difference of gradients of the plurality of voxels includes calculating a difference between a center voxel of the cell and all other voxels in the cell.

The method may further include receiving the sensor data from a LIDAR sensor.

The method may further include dividing the point cloud data into a plurality of cells, and the selecting the cell may include selecting a cell from among the plurality of cells.

According to an exemplary embodiment, an apparatus that classifies light detection and ranging (LIDAR) sensor data is provided. The apparatus includes at least one memory comprising computer executable instructions; and at least one processor configured to read and execute the computer executable instructions. The computer executable instructions cause the at least one processor to transform sensor data of the LIDAR into point cloud data, select a cell including a subset of the point cloud data, divide the selected cell into a plurality of voxels, calculate a difference of gradients for the plurality of voxels, perform a first pass on the plurality of voxels to identify voxels that contain an object based the difference of gradients, perform a second pass on the plurality of voxels to identify voxels that contain the object by adjusting a voxel with at least one from among a jitter parameter and a rotation parameter, and output a centroid average of voxels identified as containing the object.

The point cloud data may include at least one from among LASer (LAS) file format and point cloud data (PCD) file format.

The point cloud data may include x coordinate data, y coordinate data, z coordinate data and a reflective intensity value.

The computer executable instructions cause the at least one processor to perform the second pass on the plurality of voxels to identify voxels that contain the object by adjusting a voxel with the rotation parameter by rotating points of the voxels, comparing the adjusted voxel to clustered data, and outputting a centroid average of the adjusted voxel identified as containing the object if the comparing indicates the adjusted voxel contains the object.

The computer executable instructions further cause the at least one processor to perform the second pass on the plurality of voxels to identify voxels that contain the object by adjusting a voxel with the jitter parameter by translating points of the voxel, comparing the adjusted voxel to clustered data, and outputting a centroid average of the adjusted voxel identified as containing the object if the comparing indicates the adjusted voxel contains the object.

The object may include at least one from among a traffic control device, a traffic control sign, and a traffic control light.

The computer executable instructions may further cause the at least one processor to calculate the difference of gradients of the plurality of voxels by calculating a difference between a center voxel of the cell and all other voxels in the cell.

The apparatus may further include a LIDAR sensor. The computer executable instructions may further cause the at least one processor to receive the sensor data from a LIDAR sensor.

The computer executable instructions may further cause the at least one processor to divide the point cloud data into a plurality of cells and select the cell by selecting a cell from among the plurality of cells.

The computer executable instructions may further cause the at least one processor to divide the point cloud data into a plurality of cells based on features of the point cloud data.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
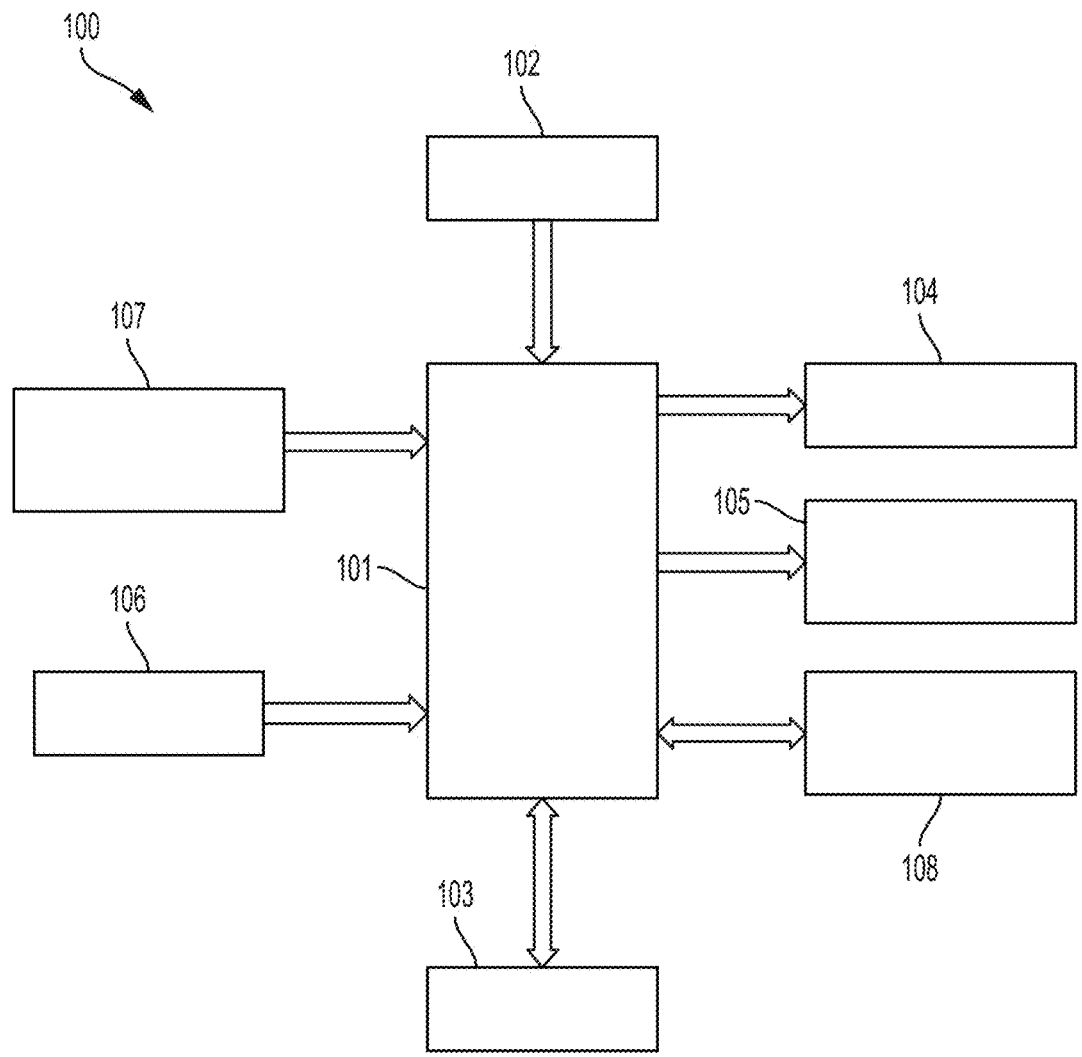
FIG. 1 shows a block diagram of an apparatus that classifies light detection and ranging sensor data according to an exemplary embodiment.

An apparatus and method for classifying light detection and ranging information will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles are being equipped with sensors that are capable of detecting conditions or objects of an environment around a vehicle. The sensors provide information on conditions or objects that exist in the environment and this information may be used to control the vehicle or to assist an operator of a vehicle. One such sensor, e.g., a LIDAR, may be configured to provide light detection and ranging information. The light detection and ranging information may be used to detect an object such as a traffic control device or a traffic light. However, light detection and ranging information must be efficiently processed and classified in order to identify an object from the information.

To address the above issue, light detection and ranging information may be divided and information may be clustered for the efficient identification of features. In addition, the information may be adjusted to account for environmental issues such as wind by taking into account jitter and rotation parameters when processing the light detection and ranging information.

FIG. 1 shows a block diagram of an apparatus that classifies light detection and ranging information 100 according to an exemplary embodiment. As shown in FIG. 1, the apparatus that classifies light detection and ranging information 100, according to an exemplary embodiment, includes a controller 101, a power supply 102, a storage 103, an output 104, a vehicle drive controller 105, a user input 106, an object detection sensor 107, and a communication device 108. However, the apparatus that classifies light detection and ranging information 100 is not limited to the aforementioned configuration and may be configured to include additional elements and/or omit one or more of the aforementioned elements. The apparatus that classifies light detection and ranging information 100 may be implemented as part of a vehicle, as a standalone component, as a hybrid between an on vehicle and off vehicle device, or in another computing device.

The controller 101 controls the overall operation and function of the apparatus that classifies light detection and ranging information 100. The controller 101 may control one or more of a storage 103, an output 104, a vehicle drive controller 105, a user input 106, an object detection sensor 107, and a communication device 108 of the apparatus that classifies light detection and ranging information 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the vehicle drive controller 105, the user input 106, the object detection sensor 107, and the communication device 108 of the apparatus that classifies light detection and ranging information 100. The information may be sent and received via a bus or network, or may be directly read or written to/from one or more of the storage 103, the output 104, the user input 106, the object sensor 107, and the communication device 108 of the apparatus that classifies light detection and ranging information 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the vehicle drive controller 105, the user input 106, the object detection sensor 107, and the communication device 108, of the apparatus that classifies light detection and ranging information 100. The power supply 102 may include one or more from among a battery, an outlet, a capacitor, a solar energy cell, a generator, a wind energy device, an alternator, etc.

The storage 103 is configured for storing information and retrieving information used by the apparatus that classifies light detection and ranging information 100. The storage 103 may be controlled by the controller 101 to store and retrieve information received from the controller 101, the object detection sensor 107, and/or the communication device 108. The information may include light detection and ranging information including three-dimensional (x, y, z) coordinates and a reflective intensity values or reflectivity values. The light detection and ranging information may be provided in a LASer (LAS) file format or a point cloud data (PCD) file format. The storage 103 may also be configured to store clustered training data and human labels of the clustered training data from an array of features that are calculated from the sensor data. The storage 103 may also include the computer instructions configured to be executed by a processor to perform the functions of the apparatus that classifies light detection and ranging information 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that classifies light detection and ranging information 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may output notification and/or information including one or more from among an audible notification, a light notification, and a display notification. The notifications and/or information may indicate the status of the traffic control device and/or may indicate whether the traffic control device is detected. In one example, the output 104 may output a centroid average of voxels identified as containing the object, a graphic showing the identified object, or a map and an indicator around the identified object.

The vehicle drive controller 105 may be one configured to control one or more from a trajectory of a vehicle, a speed of a vehicle, acceleration/deceleration of a vehicle. For example, the vehicle controller 105 may be configured to adjust the throttle, adjust the power going to a motor, adjust the fuel being injected into a combustion chamber, and/or initiate a brake to control a speed of a vehicle. In another example, the vehicle controller 105 may be configured to change the trajectory of the vehicle by controlling the steering wheel or wheels of a vehicle. The vehicle drive controller 105 may control a vehicle according to the detected object type or according to a signal or light emitted from the detected object.

The user input 106 is configured to provide information and commands to the apparatus that classifies light detection and ranging information 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a steering wheel, a touchpad, etc. The user input 106 may be configured to receive a user input to acknowledge or dismiss the notification output by the output 104. The user input 106 may also be configured to receive a user input to label training data from an operator of the apparatus that classifies light detection and ranging information 100.

The object detection sensor 107 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor. The object detection sensor 107 may be configured to scan an area around a vehicle to detect an object such as a traffic control device. The object detection sensor 107 may be configured to provide light detection and ranging information. The light detection and ranging information may include a three-dimensional (x, y, z) coordinate and a reflective intensity value or reflectivity value. The light detection and ranging information may be provided in a LASer (LAS) file format or a point cloud data (PCD) file format.

The communication device 108 may be used by the apparatus that classifies light detection and ranging information 100 to communicate with various types of external apparatuses according to various communication methods. The communication device 108 may be used to send/receive information including light detection and ranging information including three-dimensional (x, y, z) coordinates and a reflective intensity values or reflectivity values. The light detection and ranging information may be provided in a LASer (LAS) file format or a point cloud data (PCD) file format. The communication device 108 may also be used to receive clustered training data and human labels of the clustered training data of feature vectors from an array of features that are calculated from the sensor data.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to another exemplary embodiment, the controller 101 of the apparatus that classifies light detection and ranging information 100 may be configured to transform sensor data of the LIDAR into point cloud data, select a cell including a subset of the point cloud data, divide the selected cell into a plurality of voxels, calculate a difference of gradients for the plurality of voxels, perform a first pass on the plurality of voxels to identify voxels that contain an object based the difference of gradients, perform a second pass on the plurality of voxels to identify voxels that contain the object by adjusting a voxel with at least one from among a jitter parameter and a rotation parameter, and output a centroid average of voxels identified as containing the object.

The controller 101 of the apparatus that classifies light detection and ranging information 100 may be configured to perform the second pass on the plurality of voxels to identify voxels that contain the object by adjusting a voxel with the rotation parameter by rotating points of the voxels, comparing the adjusted voxel to clustered data, and outputting a centroid average of the adjusted voxel identified as containing the object if the comparing indicates the adjusted voxel contains the object.

The controller 101 of the apparatus that classifies light detection and ranging information 100 may be configured to perform the second pass on the plurality of voxels to identify voxels that contain the object by adjusting a voxel with the jitter parameter by translating points of the voxel, comparing the adjusted voxel to clustered data, and outputting a centroid average of the adjusted voxel identified as containing the object if the comparing indicates the adjusted voxel contains the object.

The controller 101 of the apparatus that classifies light detection and ranging information 100 may be configured to calculate the difference of gradients of the plurality of voxels by calculating a difference between a center voxel of the cell and all other voxels in the cell. In addition, the controller 101 of the apparatus that classifies light detection and ranging information 100 may be configured to receive the sensor data from a LIDAR sensor.

The controller 101 of the apparatus that classifies light detection and ranging information 100 may be configured to divide the point cloud data into a plurality of cells and select the cell by selecting a cell from among the plurality of cells. The controller 101 may divide the point cloud data into a plurality of cells based on features of the point cloud data.

Figure 2:
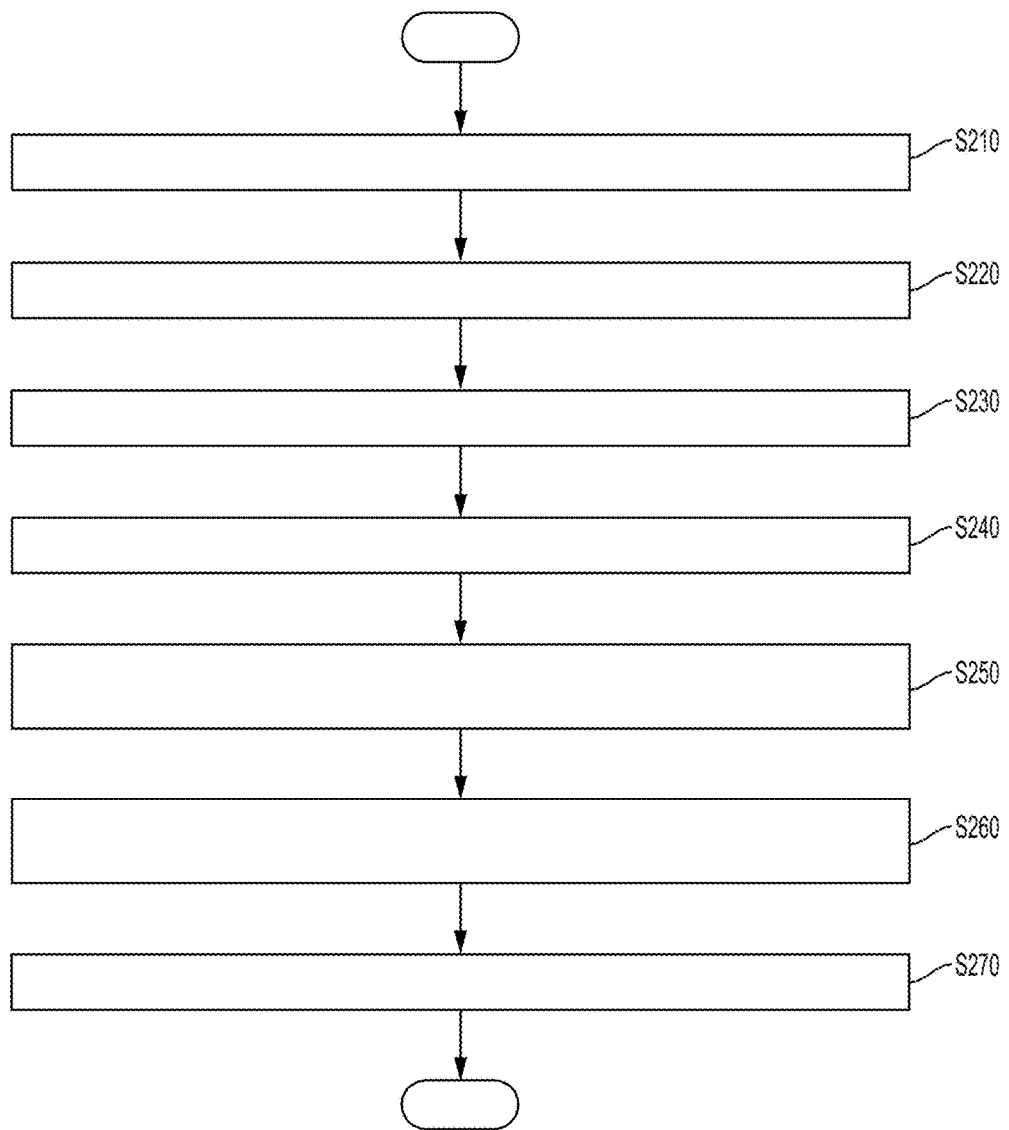
FIG. 2 shows a flowchart for a method for classifying light detection and ranging sensor data according to an exemplary embodiment.

FIG. 2 shows a flowchart for classifying light detection and ranging sensor data according to an exemplary embodiment. The method of FIG. 2 may be performed by the apparatus that classifies light detection and ranging information 100 or may be encoded into a computer readable medium as instructions that are executable by a computer to perform the method.

Referring to FIG. 2, sensor data of a LIDAR is transformed into point cloud data in operation S210. A cell including a subset of the point cloud data is selected in operation S220. The selected cell is divided into a plurality of voxels in operation S230. Then, a difference of gradients of the plurality of voxels is calculated in operation S240.

Based on the calculated difference of gradients, a first pass is performed on the plurality of voxels to identify voxels that contain an object in operation S250. Then, a second pass is performed on the plurality of voxels by adjusting a voxel with a jitter parameter and a rotation parameter to identify an adjusted voxel that contains the object in operation S260. In operation S270, a centroid average of voxels identified as containing the object is output.

Figure 3:
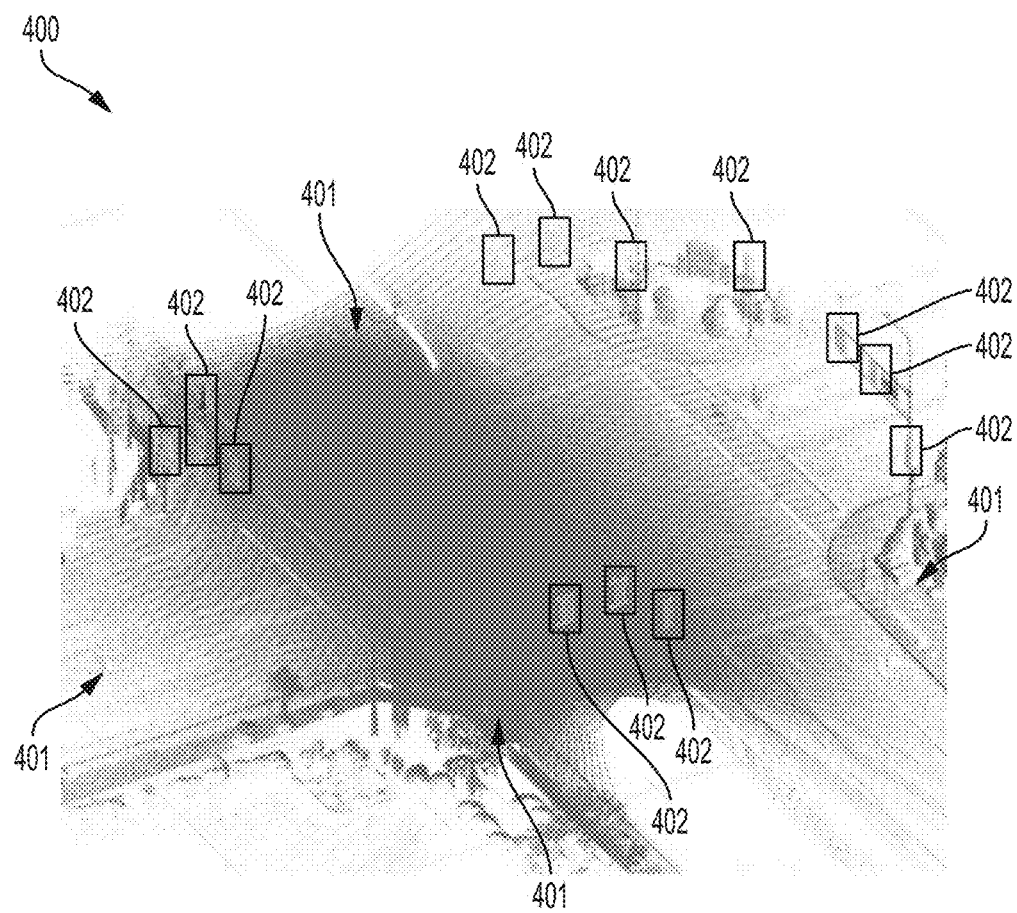
FIG. 3 shows illustrations of objects identified using the light detection and ranging sensor data according to an aspect of an exemplary embodiment.

FIG. 3 shows illustrations of objects identified using the light detection and ranging sensor data according to an aspect of an exemplary embodiment. Referring to FIG. 3, an image 400 of an area that has been scanned by a sensor is shown. The image 400 includes data points 401 of sensor data detected by LIDAR sensor. As shown by boxes 402, objects such as traffic lights and signs can be identified from the sensor data by using the apparatus and method for classifying light detection and ranging sensor data 100.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for classifying light detection and ranging (LIDAR) sensor data, the method comprising:
   transforming sensor data of the LIDAR into point cloud data;
   selecting a cell including a subset of the point cloud data;
   dividing the selected cell into a plurality of voxels;
   calculating a difference of gradients for the plurality of voxels;
   performing a first pass on the plurality of voxels to identify voxels that contain an object based on the difference of gradients;
   performing a second pass on the plurality of voxels to identify voxels that contain the object by adjusting a voxel with at least one from among a jitter parameter and a rotation parameter; and
   outputting a centroid average of voxels identified as containing the object,
   wherein the calculating the difference of gradients of the plurality of voxels comprises calculating a difference between a center voxel of the cell and all other voxels in the cell.

2. The method of claim 1, wherein the point cloud data comprises at least one from among LASer (LAS) file format and point cloud data (PCD) file format.

3. The method of claim 1, wherein the point cloud data comprises x coordinate data, y coordinate data, z coordinate data and a reflective intensity value.

4. The method of claim 1, wherein the performing the second pass on the plurality of voxels to identify voxels that contain the object comprises:
   adjusting a voxel with the rotation parameter by rotating points of the voxels;
   comparing the adjusted voxel to clustered data;
   outputting a centroid average of the adjusted voxel identified as containing the object if the comparing indicates the adjusted voxel contains the object.

5. The method of claim 1, wherein the performing the second pass on the plurality of voxels to identify voxels that contain the object comprises:
   adjusting a voxel with the jitter parameter by translating points of the voxel;
   comparing the adjusted voxel to clustered data;
   outputting a centroid average of the adjusted voxel identified as containing the object if the comparing indicates the adjusted voxel contains the object.

6. The method of claim 1, wherein the object comprises at least one from among a traffic control device, a traffic control sign, and a traffic control light.

7. The method of claim 1, further comprising receiving the sensor data from a LIDAR sensor.

8. The method of claim 1, further comprising dividing the point cloud data into a plurality of cells,
    wherein the selecting the cell comprises selecting a cell from among the plurality of cells.

9. A non-transitory computer readable medium comprising computer instructions executable to perform the method of claim 1.

10. An apparatus that classifies light detection and ranging (LIDAR) sensor data, the apparatus comprising:
    at least one memory comprising computer executable instructions; and
    at least one processor configured to read and execute the computer executable instructions, the computer executable instructions causing the at least one processor to:
    transform sensor data of the LIDAR into point cloud data;
    select a cell including a subset of the point cloud data;
    divide the selected cell into a plurality of voxels;
    calculate a difference of gradients for the plurality of voxels;
    perform a first pass on the plurality of voxels to identify voxels that contain an object based on the difference of gradients;
    perform a second pass on the plurality of voxels to identify voxels that contain the object by adjusting a voxel with at least one from among a jitter parameter and a rotation parameter; and
    output a centroid average of voxels identified as containing the object,
    wherein the computer executable instructions further cause the at least one processor to calculate the difference of gradients of the plurality of voxels by calculating a difference between a center voxel of the cell and all other voxels in the cell.

11. The apparatus of claim 10, wherein the point cloud data comprises at least one from among LASer (LAS) file format and point cloud data (PCD) file format.

12. The apparatus of claim 10, wherein the point cloud data comprises x coordinate data, y coordinate data, z coordinate data and a reflective intensity value.

13. The apparatus of claim 10, wherein the computer executable instructions cause the at least one processor to perform the second pass on the plurality of voxels to identify voxels that contain the object by:
    adjusting a voxel with the rotation parameter by rotating points of the voxels;
    comparing the adjusted voxel to clustered data; and
    outputting a centroid average of the adjusted voxel identified as containing the object if the comparing indicates the adjusted voxel contains the object.

14. The apparatus of claim 10, wherein the computer executable instructions further cause the at least one processor to perform the second pass on the plurality of voxels to identify voxels that contain the object by:
    adjusting a voxel with the jitter parameter by translating points of the voxel;
    comparing the adjusted voxel to clustered data; and
    outputting a centroid average of the adjusted voxel identified as containing the object if the comparing indicates the adjusted voxel contains the object.

15. The apparatus of claim 10, wherein the object comprises at least one from among a traffic control device, a traffic control sign, and a traffic control light.

16. The apparatus of claim 10, further comprising a LIDAR sensor,
    wherein the computer executable instructions further cause the at least one processor to receive the sensor data from a LIDAR sensor.

17. The apparatus of claim 10, wherein the computer executable instructions further cause the at least one processor to divide the point cloud data into a plurality of cells and select the cell by selecting a cell from among the plurality of cells.

18. The apparatus of claim 10, wherein the computer executable instructions further cause the at least one processor to divide the point cloud data into a plurality of cells based on features of the point cloud data.

* * * * *